United States Patent [19]

Lowe

[11] 4,399,079

[45] Aug. 16, 1983

[54] METHOD AND APPARATUS FOR GENERATING VAPOR OF A VOLATILE LIQUID FUEL AND OPERATING AN INTERNAL COMBUSTION ENGINE THEREWITH

[75] Inventor: Charles L. Lowe, Laurel, Miss.

[73] Assignee: Jacob H. Grayson, Hattiesburg, Miss.

[21] Appl. No.: 26,594

[22] Filed: Apr. 4, 1979

[51] Int. Cl.³ .............................................. B01F 3/04
[52] U.S. Cl. .................... 261/36 A; 261/119 R; 261/DIG. 83; 261/64 R; 261/55; 261/DIG. 6; 55/249
[58] Field of Search ............ 261/119 A, 119 R, 36 A, 261/64 R, 55, 36 R, DIG. 83; 55/249; 123/133

[56] References Cited

U.S. PATENT DOCUMENTS

| Re. 13,684 | 2/1914 | Heslewood | 261/36 R |
|---|---|---|---|
| 163,323 | 5/1875 | Martin | 261/119 R |
| 884,610 | 4/1908 | Rateau | 261/119 R |
| 919,249 | 4/1909 | Ruddiman | 261/119 R |
| 1,046,539 | 12/1912 | Bates | 123/133 |
| 1,470,461 | 10/1923 | Maclean | 123/133 |
| 1,731,583 | 10/1929 | Mallory | 123/133 |
| 1,808,956 | 6/1931 | Ketterer | 261/36 R |
| 1,871,302 | 8/1932 | Carroll | 123/133 |
| 1,997,497 | 4/1935 | Pogue | 261/36 A |
| 2,201,448 | 5/1940 | Myers | 261/119 R |
| 2,229,452 | 1/1941 | Hammer et al. | 261/70 R |
| 2,234,901 | 3/1941 | Jones | 123/133 |
| 2,616,676 | 11/1952 | Walker | 261/36 R |
| 2,742,886 | 4/1956 | McPherson | 261/36 A |
| 2,792,202 | 5/1957 | Griffith | 261/36 R |
| 2,884,917 | 5/1959 | Quinby | 123/133 |
| 2,892,692 | 6/1959 | Anderson | 261/145 |
| 3,039,862 | 6/1962 | Yocham | 261/119 R |
| 3,473,299 | 10/1969 | Powers | 261/119 R |
| 3,851,633 | 12/1974 | Shih | 123/133 |
| 3,931,800 | 1/1976 | Gendron | 123/133 |
| 3,931,801 | 1/1976 | Rose et al. | 123/133 |
| 4,003,356 | 1/1977 | Naylor | 123/133 |
| 4,040,403 | 8/1977 | Rose et al. | 261/119 A |
| 4,074,666 | 2/1978 | Pierce et al. | 123/133 |
| 4,094,275 | 6/1978 | Auiler et al. | 123/133 |

FOREIGN PATENT DOCUMENTS

808823 11/1936 France .............................. 261/36 A

Primary Examiner—Tim R. Miles
Attorney, Agent, or Firm—L. S. Van Landingham, Jr.

[57] ABSTRACT

A novel method and improved apparatus are disclosed for generating fuel vapor from a volatile normally liquid fuel, safely handling and controlling the fuel vapor, and utilizing the same in the operation of an internal combustion engine. Preferably, the fuel vapor is generated by introducing the liquid fuel under pressure into the lower portion of a vessel via an elongated tubular member having a plurality of spaced openings. The pressurized liquid fuel flows from the openings under vigorous conditions of agitation and fuel vapor is evolved from the liquid surface without forming finely subdivided liquid droplets in the vapor phase. Air is mixed with fuel vapor in the upper portion of the vessel in an amount sufficient to lower the dew point, but insufficient to produce an explosive mixture. The mixture is withdrawn from the vessel and, after adding sufficient air to produce an explosive mixture and for efficient combustion, is passed to the intake manifold. Prior to entering the intake manifold, the fuel vapor, the air admixed therewith, and the admixture of air and fuel vapor remain cool and are not heated to an elevated temperature by an extraneous source of heat. They also are maintained under a pressure not greater than atmospheric, and are passed through the system solely in response to suction from the intake manifold and without being placed under superatmospheric pressure. In a further aspect, the above novel method and improved apparatus are used in modifying a conventional internal combustion engine having a prior art carburetor. The resultant modified internal combustion engine operates more efficiently and with lower undesirable exhaust emissions.

24 Claims, 11 Drawing Figures

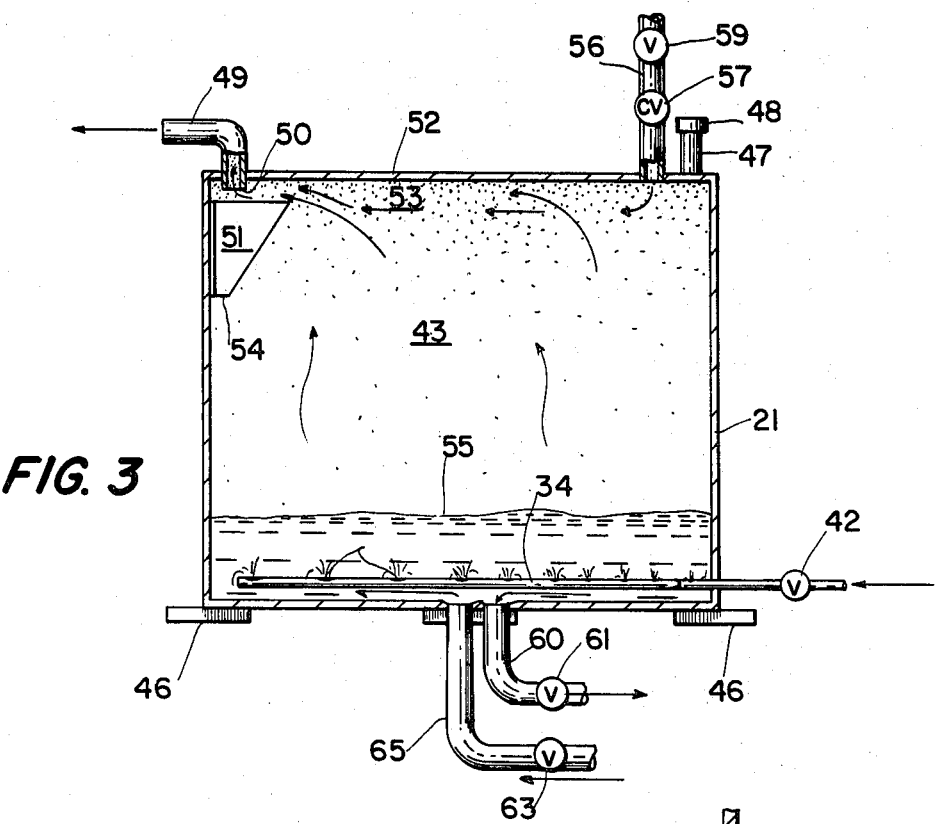
FIG. 3
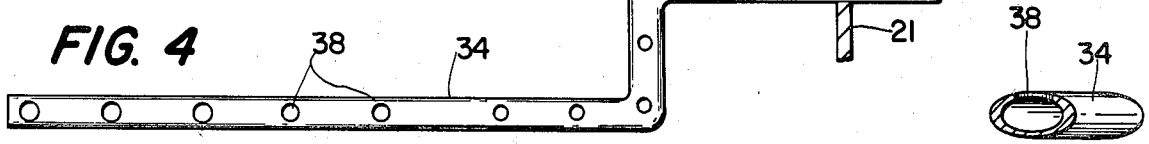
FIG. 4
FIG. 5
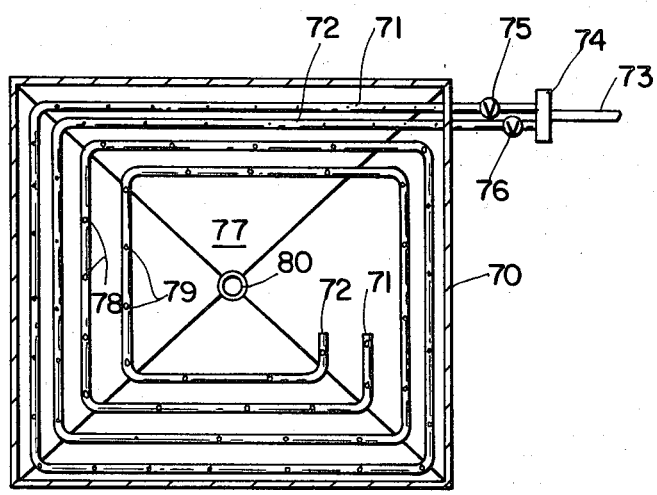
FIG. 6

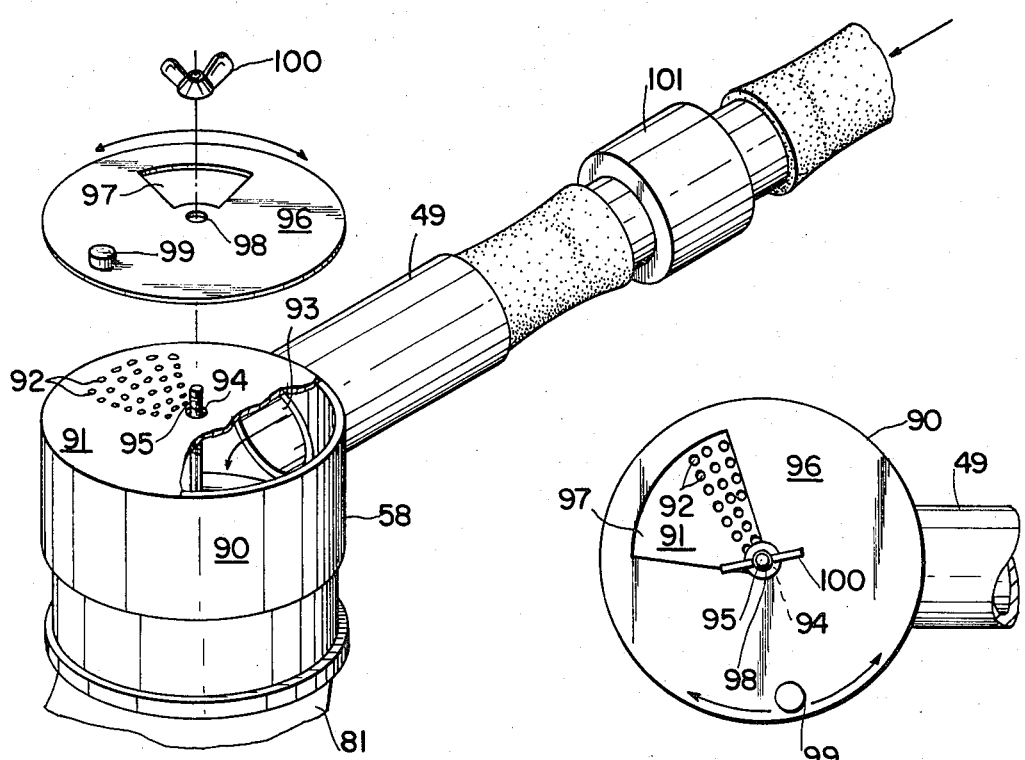
FIG. 7
FIG. 8
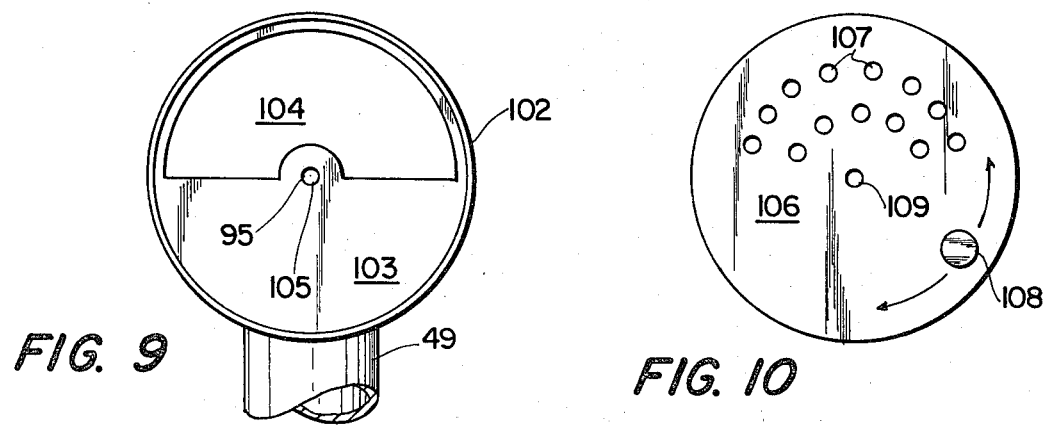
FIG. 9
FIG. 10
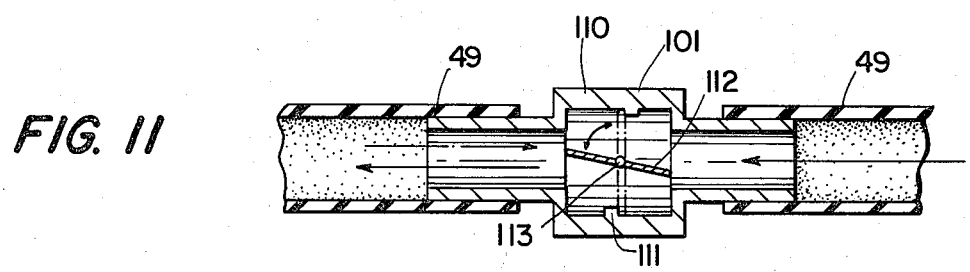
FIG. 11

METHOD AND APPARATUS FOR GENERATING VAPOR OF A VOLATILE LIQUID FUEL AND OPERATING AN INTERNAL COMBUSTION ENGINE THEREWITH

THE BACKGROUND OF THE INVENTION

THE FIELD OF THE INVENTION

The present invention broadly relates to the operation of an internal combustion engine on an admixture of air and fuel vapor generated from a volatile normally liquid fuel. In one of its more specific aspects, the invention is concerned with a novel method and improved apparatus for generating fuel vapor from a volatile normally liquid fuel for an internal combustion engine. In another of its aspects, the invention relates to a novel method and improved apparatus for safely handling and controlling fuel vapor, and utilizing the same in the operation of an internal combustion engine. The invention is additionally concerned with a novel method and improved apparatus useful in modifying a conventional internal combustion engine including a prior art carburetor for preparing a fuel charge from a volatile normally liquid fuel, whereby the said internal combustion engine following modification is capable of operating more efficiently and with lower exhaust emissions on fuel vapor that is generated from the said liquid fuel.

The Prior Art

Conventional gasoline powered internal combustion engines include a carburetor into which the gasoline is introduced and atomized, and atmospheric air is introduced simultaneously and admixed with the atomized gasoline. The liquid gasoline is not completely vaporized at the time of combustion and a substantial amount exists in the form of finely divided droplets which do not burn completely. As a result, prior art internal combustion engines utilizing a conventional carburetor for preparation of an air-liquid fuel admixture to be combusted are very inefficient. They are also further characterized by unacceptable levels of undesirable exhaust emissions, such as carbon monoxide and uncombusted hydrocarbons.

It has been recognized heretofore that the efficiency of internal combustion engines of the aforementioned type could be improved and the exhaust emissions reduced by vaporizing the liquid fuel, and then admixing the resultant fuel vapor with atmospheric air to prepare the charge to be combusted. However, the prior art systems available for generating the fuel vapor and thereafter utilizing the same in the operation of an internal combustion engine have not been entirely satisfactory.

For instance, the prior art systems for generating fuel vapor often involve heating the liquid fuel with hot exhaust gases, or other sources of high temperature, to thereby evaporate the same at an elevated temperature which may approach or reach the boiling point. The resultant hot fuel vapor has a relatively low volumetric efficiency per unit of volume when admixed with atmospheric air in the preparation of the charge to be combusted. This reduces the amount of power developed by the internal combustion engine as compared with the theoretical amount of power available when using cool fuel vapors in preparing the charge. The use of elevated temperature in evaporating the liquid fuel also creates an unacceptable fire and/or explosion hazard which endangers the lives of occupants in an automotive vehicle powered by the internal combustion engine. Additionally, the hot fuel vapor is unstable and tends to form fog-like finely divided liquid fuel droplets. These fuel droplets remain suspended in the fuel vapor and fail to combust completely, and thus reduce efficiency and increase exhaust emissions. The instability of the hot fuel vapor also results in liquid fuel being deposited on surfaces in contact therewith. The surfaces wetted with the liquid fuel create a fire hazard, and inasmuch as the liquid fuel deposited thereon is not available for combustion, the overall efficiency is further reduced.

In other systems for generating fuel vapor proposed heretofore, atmospheric air is bubbled through the liquid fuel, and/or the atmospheric air is directed directly onto the liquid fuel surface. In some instances, these systems require means for heating the liquid fuel and/or the air to be a sufficiently elevated temperature to assure evolution of sufficient fuel vapor for operating the internal combustion engine. Also, these systems introduce sufficient air to result in an explosive mixture being produced for operating the internal combustion engine. Thus, an unacceptable fire and explosion hazard is created.

In view of the foregoing, it is apparent that the prior art systems for generating fuel vapor, handling and/or controlling the resultant fuel vapor, and utilizing the same in the operation of an internal combustion engine have not been entirely satisfactory. The present invention overcomes the deficiencies of the prior art and provides an entirely satisfactory method and apparatus for generating vapor of a volatile liquid fuel and operating an internal combustion engine therewith.

THE SUMMARY OF THE INVENTION

The apparatus of the invention for generating vapor of a volatile liquid fuel and operating an internal combustion engine therewith includes vessel means containing the fuel vapor thus generated and an internal combustion engine. The internal combustion engine has a plurality of cylinders for combustion of the fuel vapor, and fuel vapor supply means for supplying a mixture of the fuel vapor and air to the cylinders for combustion in response to reduced pressure within the cylinders. The fuel vapor supply means includes an intake manifold and fuel vapor conduit means in communication with the interior of the intake manifold means whereby suction is applied thereto when the fuel vapor is supplied the cylinders upon operating the internal combustion engine. The fuel vapor conduit means has first and second end portions. The first end portion is in communication with the interior of the intake manifold, and the second end portion is in communication with an upper portion of the interior of the vessel means containing the fuel vapor. Thus, when the internal combustion engine is operating, the fuel vapor supply means supplies fuel vapor to the cylinders and suction is applied to the fuel vapor conduit means which causes fuel vapor to be withdrawn from an upper portion of the vessel means by suction and then passed through the fuel vapor conduit means to the intake manifold. Means is provided for vaporizing the volatile normally liquid fuel to thereby produce additional fuel vapor in the vessel means. The vaporizing means includes means for applying pressure to the liquid fuel and means for substantially continuously introducing an excess of the resultant pressurized liquid fuel into a lower portion of the vessel means under vigorous conditions of agitation to thereby vaporize a portion of the liquid fuel. The pressurized liquid fuel is introduced into the vessel means at a rate sufficiently in excess of the vaporization rate whereby an agitated body of a freshly introduced liquid fuel phase is present in the lower portion of the vessel means and a fuel vapor phase is present above the liquid fuel phase. The means for introducing the pressurized liquid fuel is effective to introduce the liquid fuel under vigorous agitation conditions without forming a substantial amount of finely subdivided liquid fuel that becomes suspended in the fuel vapor phase. The fuel vapor phase in the upper portion of the interior of the vessel means is free of liquid fuel in the form of finely subdivided particles when withdrawn via the fuel vapor conduit means. The liquid fuel is withdrawn from the lower portion of the vessel means at a rate to maintain a desired liquid level while substantially continuously introducing the pressurized liquid fuel as aforementioned.

The method of the invention for generating fuel vapor may utilize the aforementioned apparatus for generating vapor. Thus, the liquid fuel may be vaporized to produce additional fuel vapor in the vessel means by applying pressure thereto and substantially continuously introducing an excess of the resultant pressurized liquid fuel into a lower portion of the vessel means under vigorous conditions of agitation to thereby vaporize a portion thereof. The pressurized liquid fuel is introduced into the vessel means at a rate sufficiently in excess of the vaporization rate whereby an agitated body of the freshly introduced liquid fuel phase is present in the lower portion of the vessel means and a fuel vapor phase is present above the resultant liquid fuel phase. The liquid fuel is introduced under vigorous conditions of agitation but without forming a substantial amount of finely subdivided liquid fuel that becomes suspended in the fuel vapor phase. The fuel vapor phase in the upper portion of the interior of the vessel is free of liquid fuel in the form of finely subdivided particles when withdrawn via the fuel vapor conduit means. The liquid fuel is withdrawn from the liquid fuel phase in the lower portion of the vessel means at a rate to maintain a desired liquid level while substantially continuously introducing the pressurized liquid fuel as aforementioned.

The present invention is also useful in handling, controlling and utilizing fuel vapor prepared by the prior art apparatus, as well as the aforementioned apparatus of the present invention. In practicing this further improvement of the invention, means is provided for admixing air with fuel vapor in the vessel means to thereby produce an admixture of air and fuel vapor which is withdrawn from the vessel means via the fuel vapor conduit means. The means for admixing air with the fuel vapor is effective to produce an admixture of air and fuel vapor withdrawn via the fuel vapor conduit means containing sufficient air to reduce the dew point of the fuel vapor, but insufficient air to produce an explosive mixture, and less than that amount of air required for efficient combustion. The fuel vapor conduit means includes means for adjusting the ratio of air to fuel vapor in the admixture thereof withdrawn from the vessel means prior to its reaching the intake manifold means to thereby add additional air and produce an admixture containing sufficient air for efficient combustion of the fuel vapor. The aforementioned apparatus may also include means located between the second end portion of the fuel conduit means and the means for adjusting the ratio of air to fuel vapor for protecting the vessel means against backfire from the internal combustion engine.

The invention further provides a novel method whereby the fuel vapor, regardless of the manner of generating the same, may be safely handled, controlled and the internal combustion engine operated therewith. This latter method is useful in the general environment of the aforementioned improved apparatus for generating fuel vapor. In practicing this variant of the invention, air is admixed with the fuel vapor in the vessel means to thereby produce an admixture of air and fuel vapor which is withdrawn via the fuel vapor conduit means. The air is admixed with the fuel vapor in an amount effective to reduce the dew point of the fuel vapor in the withdrawn admixture, but in an amount insufficient to produce an explosive mixture, and in less than that amount of air required for efficient combustion of the fuel vapor in the internal combustion engine. The ratio of air to fuel vapor is adjusted in the admixture thereof withdrawn from the vessel means prior to its reaching the intake manifold means to thereby add additional air and produce an admixture containing sufficient air for efficient combustion of fuel vapor.

It will be appreciated that the aforementioned novel method and improved apparatus of the invention for generating fuel vapor, and also the aforementioned novel method and improved apparatus for handling, controlling and operating an internal combustion engine regardless of how the fuel vapor is generated, have certain preferred variants and embodiments. These preferred variants and embodiments will be discussed with greater particularity hereinafter, and thus they will be apparent upon considering the following detailed description of the invention. The present invention is intended to embrace these further preferred variants and embodiments, as well as those additional variants and embodiments which will be apparent to those skilled in this art upon considering the applicant's teachings in the light of the prior art.

A BRIEF DESCRIPTION OF THE ACCOMPANYING DRAWINGS

The invention will be described hereinafter in greater particularity with reference to the presently preferred embodiments thereof illustrated in the accompanying drawings, wherein:

FIG. 3 is a cross sectional view in elevation of the generating tank of FIG. 2;

FIG. 4 is a top view of one of the tubular generating elements in the generating tank of FIGS. 2 and 3, further illustrating the details of construction and the arrangement and size of the openings therein with greater particularity;

FIG. 5 is a cross sectional view of the tubular generating element of FIG. 4 taken through one of the openings therein;

FIG. 6 is a top cross sectional view of a generating tank similar in construction to that of FIGS. 2 and 3, but further illustrating a modified configuration for the tubular generating elements;

FIG. 7 is an exploded view, with a portion thereof being broken away to illustrate the interior, of one presently preferred embodiment of apparatus for controlling the amount of atmospheric air added to fuel vapor in preparing an admixture for combustion in an internal combustion engine operated in accordance with the present invention;

FIG. 8 is a top view of the assembled apparatus of FIG. 7;

FIG. 9 is a top view, with the perforated air control disc being removed to illustrate the interior, of a modified form of apparatus similar to that illustrated in FIG. 7;

Figure 1:
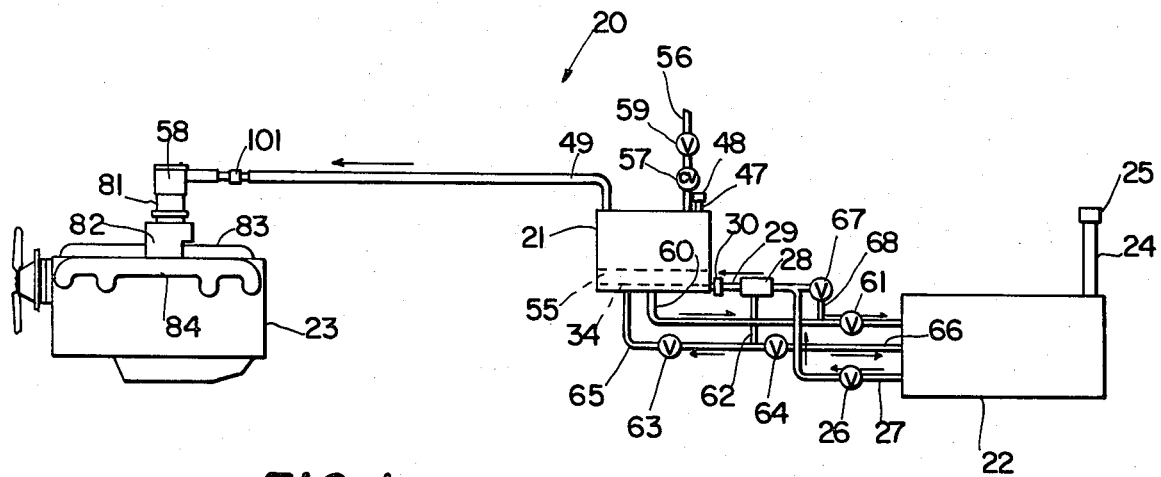
FIG. 1 is a schematic illustration of one embodiment of apparatus in accordance with the invention for generating vapor of a volatile liquid fuel for an internal combustion engine and operating an internal combustion engine therewith.

FIG. 10 is a top view of the air control disc for use with the apparatus of FIG. 9, further illustrating the arrangement of the air intake holes in the modified form of the apparatus of FIG. 9; and FIG. 11 is a longitudinal cross sectional view in elevation, with portions thereof being broken away, of the section of the vapor suction conduit including the check valve of the invention for backfire prevention.

The aforementioned eleven figures of the drawings are referred to and discussed hereinafter in greater detail.

THE DETAILED DESCRIPTION OF THE INVENTION INCLUDING THE PRESENTLY PREFERRED VARIANTS AND EMBODIMENTS THEREOF

Referring now to the drawings, and more particularly to FIGS. 1-5, the apparatus of the invention for generating vapor of a volatile liquid fuel for an internal combustion engine and operating an internal combustion engine therewith generally designated as 20 includes a fuel vapor generating tank 21, a liquid fuel tank 22 and an internal combustion engine 23. The fuel tank 22 is provided with a conventional fill pipe 24 closed off by means of a cap 25 and, upon opening valve 26 in conduit 27, a volatile liquid fuel for the internal combustion engine 23 is withdrawn therefrom and is passed to pump 28.

The withdrawn liquid fuel is then pumped under pressure through conduit 29 to header 30 which supplies tubular generating elements 31, 32, 33 and 34. The generating elements 31-34 are provided with a series of longitudinally spaced openings 35-38, respectively, through which the pressurized liquid fuel flows upon opening valve 39-42, respectively, and the terminal ends of the generating elements 31-34 are closed off. The series of openings 35-38 have graduated sizes of increasing diameter as they extend toward the terminal ends. The sizes are selected to assure that, at any given rate of flow of liquid fuel, each of the openings 35-38 receives a supply of liquid fuel which flows vigorously therefrom under pressure into the interior 43 of tank 21. At any given rate of flow of liquid fuel in generating elements 31-34, it is substantially uniformly distributed and this assures more uniform operating conditions.

Figure 2:
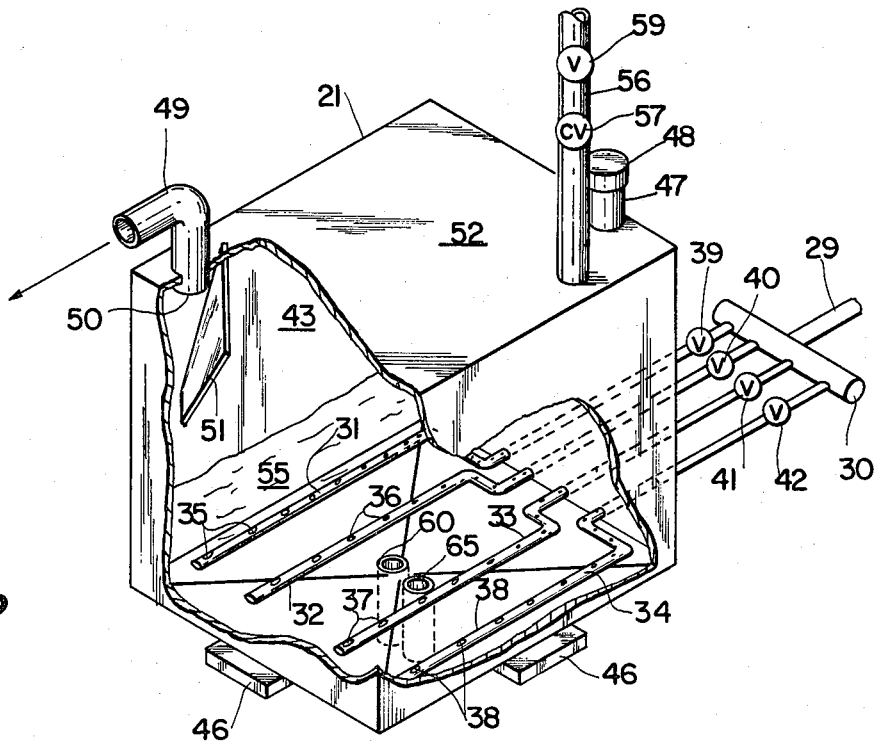
FIG. 2 is a perspective view, with portions thereof being broken away to illustrate the details of construction in the interior, of one presently preferred embodiment of a tank for generating vapor of a volatile liquid fuel for an internal combustion engine.

As is best seen in FIGS. 2 and 3, the generating tank 21 rests upon supports 46 which may be bolted or otherwise suitably attached to a supporting structure such as a frame member of an automotive vehicle. The generating tank 21 may be provided, when desired, with a fill pipe 47 having a cap 48 for sealing off the outer end. A suction conduit 49 is also provided for withdrawing fuel vapors from the interior 43. The suction conduit 49 has a lower end 50 extending slightly into the interior 43 which is protected from the raw liquid fuel 55 by baffle 51. The baffle 51 also aids in preventing any air borne droplets of liquid fuel from reaching the lower end 50 and thereafter passing upward through suction conduit 49. This is of importance in instances where the generating tank 21 is subjected to violent movement, such as when an automotive vehicle travels at high speed over rough roads or around sharp curves, which tends to displace the liquid fuel 55 upwardly. As is best seen in FIG. 3, the baffle 51 does not extend upward to the top 52 so as to provide a space 53 thereabove for flow of the fuel vapor into the lower end 50 of conduit 49. The lower end of baffle 51 is provided with an opening 54 to allow drainage of any lqiuid fuel that collects therebehind into the lower portion of generating tank 21.

The level of liquid fuel 55 in generating tank 21 should be maintained below the opening 54 in baffle 51, and also at a sufficiently low level to allow the vapor-liquid fuel phases to stabilize prior to withdrawal of the fuel vapor via suction conduit 49. It is not essential that the level of liquid fuel 55 extend above the generating elements 31-34. It is only necessary that a liquid fuel phase be present within the generating tank 21 and circulated vigorously thereby exposing a fresh liquid fuel surface continously under the conditions existing therein. This is accomplished without introducing droplets of the liquid fuel into the vapor phase at the interface between the liquid and vapor phases, and the fuel molecules appear to pass directly into the vapor phase from the surface of liquid fuel 55.

As is best shown in FIGS. 1 and 3, the excess liquid fuel 55 is withdrawn from the bottom of generating tank 21 via conduit 60 at a rate controlled by valve 61, and is returned to the fuel tank 22 by gravity. The pump 28 is provided with a by-pass conduit 62 which, upon opening valve 63 and closing valve 64, allows liquid fuel to by pass the generating elements 31-34 and be introduced via conduit 65 directly into the bottom of generating tank 21. When desired, the liquid fuel flowing in by-pass conduit 62 may be returned to fuel tank 22 upon closing valve 63 and opening valve 64 in conduit 66. Additionally, when it is desired to do so, the generating tank 21 may be used as a combined fuel tank and vapor generating tank. In such instances, the fuel tank 22 is eliminated and the body of liquid fuel 55 is recirculated continuously by closing valves 26 and 61, and opening normally closed valve 67 in conduit 68. This method of operating is not preferred as better results are usually achieved by passing the excess liquid fuel withdrawn via conduit 60 to fuel tank 22 which serves as a heat sink to stabilize the temperature of the recirculated liquid fuel.

The generating tank 21 has an air supply conduit 56 provided with a one-way flow control valve 57 biased in the closed position and a normally opened stop valve 59. Atmospheric air is introduced into the interior 43 via conduit 56, and it admixes with the rising fuel vapor as it flows in the direction of the arrows. The resultant admixture of fuel vapor and air is withdrawn via suction conduit 49. The operation and construction of valve 57 may be the same as illustrated in FIG. 11 of the drawings, and thus it is closed when suction is not applied to conduit 49, i.e., when the internal combustion engine 23 is not operating. When the internal combustion engine 23 is operating, suction is applied by suction conduit 49 and the valve 57 is moved to the open position due to the reduced pressure in the interior 43 thereby allowing atmospheric air to be drawn through conduit 56.

The volume of air introduced into the interior 43 via conduit 56 is insufficient to produce an explosive mixture or to provide the optimum combustion of the fuel vapor withdrawn via suction conduit 49. Accordingly, it is necessary to add additional air thereto in a variable amount which is determined by the operating characteristics of internal combustion engine 23. This is done by passing the admixture of fuel vapor and air withdrawn from spaces 43 via suction conduit 49 to air-fuel vapor ratio adjusting device 58.

FIG. 6 of the drawings illustrates a modified generating tank 70 which is identical in construction and operation to generating tank 21 with the exception of the configuration of the tubular generating elements 71 and 72. The generating elements 71 and 72 have an oblong transverse cross section as shown in FIG. 5 for generating elements 31-34, and extend generally parallel to each other and generally concentrically around the walls of generating tank 70. The liquid fuel is pumped under pressure via conduit 73 to header 74 and, upon opening valve 75 in generating element 71, and/or valve 76 in generating element 72, it is introduced into the interior 77 through the openings 78 and 79 in generating elements 71 and 72, respectively. The excess liquid fuel is withdrawn via conduit 80 and is passed either to fuel tank 22 or recirculated directly to generating tank 70 as previously described in discussing the operation of generating tank 21.

The internal combustion engine 23 is of the type conventionally used in powering automotive vehicles such as automobiles, trucks, buses and the like with the exception of being adapted for operating in accordance with the present invention on the fuel vapor produced in generating tank 21. The internal combustion engine 23 has the usual breather 81, but the conventional carburetor which normally is positioned thereon has been removed. The conventional throttle means 82, intake manifold 83, exhaust manifold 84, and the remaining major components have also been retained with the exception of disconnecting the fuel pump 28 from the carburetor and utilizing it as previously described with generating tank 21 for the pumping of liquid fuel.

Referring now to FIGS. 7 and 8 of the drawings, the fuel vapor-air ratio adjusting device 58 includes a hollow cup-shaped adapter 90 having an open lower end which conforms with the upper surface of breather 81 and is mounted thereon in approximately the same position as the conventional carburetor. The upper end of the adapter 90 is closed off by means of a perforated plate 91 which is formed integrally therewith. The perforated plate 91 is provided with a plurality of air holes 92 which are in communication with the hollow interior of adapter 90. The side wall of adapter 90 is provided with an opening 93 which receives the end of suction conduit 49 and thereby allows the admixture of fuel vapor and air flowing in conduit 49 to be introduced into the hollow interior. The perforated plate 91 is provided with a centrally located opening 94 which receives the upright threaded bolt 95. A circular top plate 96 having a diameter similar to that of perforated plate 91 and an aperture 97 of a configuration designed to expose and/or close off the air holes 92 is provided. The plate 96 has an opening 98 centrally located therein for receiving the threaded bolt 95 which extends therethrough. As is best seen in FIG. 8, the top plate 96 is positioned over the perforated plate 91, and is rotated by means of thumb button 99 in the directions of the arrow until the desired number of air holes 92 are exposed to the ambient atmosphere thereby allowing atmospheric air to be passed into the interior of adapter 90 in a controlled amount. The wingnut 100 is then tightened on the threaded bolt 95 to thereby retain the top plate 96 in the adjusted position.

As is well known, the breather 81 is in communication with the intake manifold 83, which is in communication with the interior of the cylinders of the internal combustion engine during the fuel intake cycle, and thus constitutes a fuel supply means for supplying fuel vapor to the cylinders for combustion in response to reduced pressure within the cylinders. The resultant fuel supply means produces suction on the interior of adapter 90, the suction conduit 49, and the interior 43 of generating tank 21. This causes the admixture of fuel vapor and air flowing in suction conduit 49 to be introduced into adapter 90, and also causes additional atmospheric air to be introduced therein via the exposed air holes 92. Sufficient additional air is introduced into adapter 90 to assure that the most efficient fuel vapor-air admixture is produced for combination in the cylinders of internal combustion engine 23. As is well understood in this art, this may be accomplished by rotating the top plate 96 until the internal combustion engine 23 operates in the most efficient manner as determined by the power produced and/or by the composition of the exhaust emissions. When the most efficient fuel vapor-air admixture is produced, then the top plate 96 is tightened into position by means of wingnut 100.

The cup shaped adapter 90 discussed above is especially useful with internal combustion engines which formerly had a four-barrel carburetor. The cup shaped adapter 102 illustrated in FIGS. 9 and 10 is especially useful with internal combustion engines which formerly had a two barrel carburetor. The adapter 102 has a general configuration similar to that of adapter 90 with the exception of the top being closed off by plate 103 which is formed integrally therewith. The plate 103 has a large opening 104 formed therein which extends approximately 180° around the circumference thereof. A smaller opening 105 is provided which is centrally located and receives threaded bolt 95. The perforated plate 106 has a plurality of air holes 107 formed therein and arranged in a configuration to be either in communication with the opening 104 and/or closed off by the remainder of plate 103 when placed thereover. The plate 106 is also provided with a thumb button 108, by means of which plate 106 may be adjusted in the directions of the arrow to thereby expose and/or close off a desired number of the air holes 107. The perforated plate 106 is shown removed from adapter 102 for purposes of clarity. However, it is understood that the opening 109 is for the purpose of receiving threaded bolt 95 upon placing plate 106 over plate 103. Also, following adjustment thereof by means of thumb button 108, the same is tightened into position with a wingnut such as wingnut 100 discussed in connection with FIGS. 7 and 8. It is further understood that the suction conduit 49 introduces the fuel vapor and air mixture flowing therein into the interior of adapter 102 in the manner previously described for adapter 90. Also, the adjustment and operation of adapter 102 is as previously described for adapter 90.

The suction conduit 49 includes a one-way flow valve 101 which serves as a safety check valve for preventing the adverse effects of backfire originating in the vicinity of adapter 90 or adapter 102. The valve housing 110 has an internally arranged annular projection 111 which is in sealing engagement with moveable valve member 112 mounted on pin 113 when in the normal biased position. Upon applying suction to adapter 90 or 102, the valve member 112 is rotated from the normal closed position illustrated in dotted line to the open position illustrated in solid line. The valve member 112 remains in the open position so long as suction is applied to suction conduit 49, i.e., while the internal combustion engine 23 is operating. In the event of backfire, the flow of gases from adapter 90 or 102 toward check valve 101 results in an immediate repositioning of valve member 112 from the position illustrated in solid line to the position illustrated in dashed line thereby tightly closing off the suction conduit 49 and preventing backfire damage. As was discussed hereinbefore, the check valve 57 may also be constructed in accordance with the check valve 101. It is understood that various types of prior air check valves may be used as check valves 57 and 101.

Prior art materials for the construction of fuel tanks for a conventional automotive vehicle such as an automobile, truck or bus, may be used for the construction of the generating tank 21. Examples of suitable materials include tin plated or galvanized steel, copper and brass. Plastics may be used when desired, and especially plastics of the types commonly used in fuel tanks for power mowers, garden tractors and the like.

The fuel to be vaporized in generating tank 21 may be any suitable readily volatilized normally liquid fuel for an internal combustion engine. Examples of suitable fuels include volatile hydrocarbons, alcohols and admixtures thereof. Conventional gasoline is usually preferred, but hydrocarbons, alcohols and admixtures thereof boiling within the gasoline range, i.e., approximately 95° F. to 450° F., may be used. Gasohol, which is an admixture of gasoline and one or more lower alcohols such as methyl, ethyl, propyl and/or isopropyl alcohol, is also useful. As will be understood by those skilled in this art, volatile normally liquid fuels having suitable characteristics for operation of an internal combustion engine provided with a conventional carburetor also may be used in practicing the present invention.

The pump 28 may be a conventional fuel pump of the type that is used in operating a conventional internal combustion engine with a carburetor. Thus, the fuel pump that is used on a given conventional internal combustion engine having a carburetor may be used for the purpose of pumping pressurized liquid fuel to the generating vessel 21 after that same internal combustion engine has been modified to operate in accordance with the present invention. Preferably, the pump 28 is a variable speed pump, and/or it is capable of otherwise varying the volume of pressurized liquid fuel supplied to generating vessel 21 directly with the speed at which the internal combustion engine is operated. This, in turn, varies the amount of fuel vapor that is produced directly with the speed of operation of the internal combustion engine to thereby meet the demand for fuel vapor. As is well understood, conventional fuel pumps are capable of varying the output of liquid fuel with the operating speed of the automotive vehicle to thereby assure that a supply of fuel is available at the carburetor at all times regardless of the operating speed. The fuel pump that is normally used in operating conventional internal combustion engines with a carburetor may be merely disconnected at the carburetor inlet and then connected to the pressurized liquid fuel conduit 29 of the present invention. The fuel pump 28 may be conventionally operated off the camshaft of the modified internal combustion engine 23, or it may be a conventional electrical fuel pump. It is also possible to use other types of prior art pumps suitable for pumping gasoline and other volatile liquid fuels for internal combustion engines.

Operating an internal combustion engine 23 modified in accordance with the present invention has many advantages over the operation of the same internal combustion engine with a conventional carburetor prior to the modification. The internal combustion engine 23 is far more efficient and fuel consumption is reduced very markedly to thereby assure greatly increased mileage for automotive vehicles powered therewith. The exhaust emissions are also much lower as the fuel vapor burns more cleanly and completely. Exhaust emission pollution is reduced to acceptable levels in many instances without the need for treatment of the exhaust gases in the presence of a catalyst. Vaporization of the liquid fuel also assures that solid and high boiling contaminants contained in the initial liquid fuel are not introduced into the internal combustion engine. In this respect, reference is made to U.S. Pat. No. 2,229,452, which is incorporated herein by reference. As is indicated in this patent, the operation of the method and apparatus disclosed hereinbefore over long periods of time may result in the gradual accumulation of "strip oil" and a gradually reduced rate of production of fuel vapor. The rate of production of fuel vapor may be increased and restored to its former level in accordance with U.S. Pat. No. 2,229,452 by removing the strip oil, and replacing it with fresh volatile liquid fuel. Oil changes may be made at longer mileage intervals and less maintenance in general is needed. The internal combustion engine 23 also has a longer overall useful life. In view of the foregoing, the present invention is of great economic importance due to the shortage and rapidly rising cost of fuel for internal combustion engines. Also, the present invention is of great practical importance as the pollution problem caused by the exhaust emissions of internal combustion engines operated in congested metropolitan areas is reduced very markedly.

A conventional internal combustion engine of the type installed in an automotive vehicle may be easily and inexpensively modified to operate in accordance with the invention. For example, a prior art gasoline engine installed in an automotive vehicle may be modified by disconnecting the fuel line at the carburetor, and then removing the carburetor and air filter. The fuel pump is allowed to remain in place and it is used as fuel pump 28, and the fuel line formerly attached to the carburetor is attached to conduit 29. The fuel tank 22 is the conventional fuel tank for the automotive vehicle and need not be changed in any respect as the fuel withdrawal line 27 is already attached to fuel pump 28. It is only necessary to provide the generating tank 21, airfuel vapor ratio adjusting device 58, and the associated conduits and valves therefor in the form of a modification kit. Inasmuch as the items in the kit may be adapted to fit a given year and model of automobile, the installation thereof requires only a short period of time. The generating tank 21 is of a size fitting easily within the trunk, or it may be installed under the hood of certain models. Additionally, the design and method of construction of the items making up the modification kit are relatively inexpensive to manufacture and the kit may be sold at a reasonable cost. It is understood that a conventional air filter, which is omitted from FIG. 1 of the drawings for purposes of clarity, may be included in the modification kit to provide means for filtering the atmospheric air added by air-fuel vapor ratio adjusting device 58. Thus, the present invention provides a novel method and improved apparatus for modifying a conventional internal combustion engine including a prior art carburetor whereby the resultant modified internal combustion engine operates more efficiently and with lower exhaust emissions on fuel vapor that may be generated from the normally liquid fuel previously used.

The routine operation of the modified internal combustion engine 23 following installation of the adaptor kit will be discussed briefly to provide a more complete understanding of the invention. For the purpose of this discussion, it will be assumed that the modified internal combustion engine 23 has been operated after installation of the modification kit, but is presently not operating. Accordingly, the check valves 57 and 101 are in the closed positions, and a supply of fuel vapor exists within the interior 43 of generating tank 21 and within fuel vapor suction conduit 49 as a result of the previous operation. This fuel vapor is available for start-up and, upon turning the ignition switch, the internal combustion engine 23 starts up immediately. Thereupon, the fuel pump 28 which remains installed on internal combustion engine 23, pumps liquid fuel from fuel tank 22 into generating tank 21 under pressure and under vigorous agitation conditions via one or more of the tubular generating elements 31–34 and the openings 35–38. The output of fuel pump 28 usually varies with the speed of operation of internal combustion engine 23. Additionally, the amount of liquid fuel introduced into generating tank 21 may be controlled as desired by closing and/or opening the valves 39–42 to thereby produce the required amount of fuel vapor for operation of internal combustion engine 23.

In some instances, the valves 39–42 may be pre-set for routine operation of internal combustion engine 23, and the variable output of pump 28 is used to control the increase and/or decrease of the amount of fuel vapor required to operate internal combustion engine 23. At low speeds and/or with a relatively small engine, often only one or two of the generating elements 31–34 will be required, and the remainder may be closed off by their respective valves 39–42. Also, the valves 39–42 may be operated as necessary to have only one or two generating elements 31–34 on stream at low speed, and with additional generating elements 31–34 being put on the stream as the speed is increased by adjusting their respective valves 39–42. It is understood that, in general, the volume of fuel vapor produced varys directly with the volume of pressurized liquid fuel flowing from openings 35–38.

A saturated fuel vapor is evolved from the surface of the body of liquid fuel 55 and flows upward into the interior 43 in the direction of the arrows. The temperature thereof is relatively low due to the refrigeration effect caused by introducing the pressurized liquid fuel into the generating tank 21 via the openings 35–38. The temperature of the fuel vapor usually is approximately that of the liquid fuel in tank 22 or slightly below. Thus, the cool fuel vapors have a high volumetric efficiency when used to operate internal combustion engine 23. The level of the liquid fuel 55 may be substantially lower than illustrated in FIG. 3 of the drawings, such as to merely cover the top of the generating elements 31–34, or only slightly thereabove, as a lower liquid level assures more vigorous conditions of agitation. In any event, the liquid fuel emerging from openings 35–38 is in a vigorous state of agitation and it, in turn, agitates the body of liquid fuel 55.

The saturated fuel vapor stabilizes as it flows upward toward the top 52. The temperature thereof increases slightly, and the pressure is reduced slightly due to suction on fuel vapor conduit 49. Additionally, it is admixed with atmospheric air introduced via conduit 56 in an amount to reduce the dew point, but in an amount insufficient to form an explosive mixture, and also in an amount insufficient for efficient combustion. Thus, the admixture of fuel vapor and air withdrawn via fuel vapor suction conduit 49 has a temperature far above the dew point of the fuel vapor. In fact, it has a very dry feel to the hand. There is no tendency for small or microscopic fog like particles of liquid fuel to form therein, or for the surfaces in contact therewith to be wetted with a precipitated liquid fuel phase. This is assured by generating the fuel vapor at a low temperature, applying no pressure thereto as it is passed to device 58, allowing the temperature thereof to remain the same or increase slightly, and lowering the dew point of the fuel vapor by admixing air therewith.

The admixture of fuel vapor and air introduced into air-fuel vapor ratio adjusting device 58 is free of liquid fuel and all surfaces in contact therewith are free of liquid fuel during operation of the internal combustion engine 23. This is of importance as the efficiency of internal combustion engine 23 is increased markedly, and the undesirable exhaust emissions are decreased very markedly. Following admixture of additional air in air-fuel vapor ratio adjusting device 58 in an amount for efficient combustion, the resultant liquid fuel-free admixture is passed to intake manifold 83, and thereafter to the cylinders of internal combustion engine 23 upon demand.

The foregoing detailed description of the invention and the accompanying drawings are for purposes of illustration only, and are not intended as being limiting to the spirit or scope of the appended claims.

I claim:

1. In apparatus for generating vapor of a volatile liquid fuel for an internal combustion engine and operating an internal combustion engine therewith, the said apparatus including vessel means containing the said fuel vapor thus generated in the interior thereof and an internal combustion engine, the internal combustion engine having a plurality of cylinders for combustion of the fuel vapor and air-fuel vapor supply means for supplying a combustible admixture of air and fuel vapor to the cylinders in response to reduced pressure within the cylinders, the said air-fuel vapor supply means including an intake manifold means in communication with the interior of the cylinders, air-fuel vapor conduit means in communication with the interior of the said intake manifold means and throttle means in the said air-fuel vapor conduit means upstream of the said manifold means whereby suction is applied to the said air-fuel vapor conduit means and a combustible admixture of air and fuel vapor is supplied to the cylinders as needed for operating the internal combustion engine at varying speeds controlled by the said throttle means, the improvement which comprises air-fuel vapor conduit means having first and second end portions, the said first end portion being in communication with the interior of the intake manifold means and the said second end portion being in communication with an upper portion of the interior of the said vessel means containing the fuel vapor whereby when the internal combustion engine is operating the said air-fuel vapor supply means supplies fuel vapor to the cylinders and suction is applied to the said air-fuel vapor conduit means which causes fuel vapor to be withdrawn from an upper portion of the said vessel means by suction and passed through the air-fuel vapor conduit means to the said intake manifold means, the interior of the said vessel means being maintained under a pressure no greater than the ambient atmospheric pressure and the contents thereof being unheated by an extraneous source of heat, means for vaporizing volatile normally liquid fuel for an internal combustion engine to thereby produce additional fuel vapor in the said vessel means, the said vaporizing means being effective for vaporizing unheated volatile liquid fuel at a pressure not exceeding the ambient atmospheric pressure and with the resulting fuel vapor phase as initially generated being free of suspended liquid fuel droplets whereby the fuel vapor contained in the interior of the said vessel means is unheated by an extraneous source of heat, is under a pressure no greater than the ambient atmospheric pressure and is free of suspended finely divided liquid fuel, the said vaporizing means including means for applying pressure to the said liquid fuel and means for substantially continuously introducing an excess of the resultant pressurized liquid fuel into a lower portion of the said vessel means under vigorous conditions of agitation to thereby vaporize a portion of the liquid fuel, the said pressurized liquid fuel being introduced into the said vessel means at a rate sufficiently in excess of the vaporization rate whereby an agitated body of a freshly introduced liquid fuel phase is present in the lower portion of the said vessel means and a fuel vapor phase is present above the resultant liquid fuel phase in the upper portion of the interior of the said vessel means, the said means for introducing the pressurized liquid fuel including conduit means positioned adjacent the bottom of the said lower portion of the vessel means having a plurality of spaced openings formed therein through which fresh pressurized liquid fuel is introduced into the said lower portion of the vessel means, the said means for introducing pressurized liquid fuel also including means for controlling the rate at which the pressurized liquid fuel is introduced through the said plurality of openings and thereby controlling the rate at which the liquid fuel is vaporized, the said conduit means and plurality of openings therein being arranged in spaced relationship across the said lower portion of the vessel means and being effective to introduce the pressurized liquid fuel into the said lower portion of the vessel means substantially uniformly across the surface area thereof and under vigorous agitation conditions without forming a substantial amount of finely subdivided liquid fuel that becomes suspended in the fuel vapor phase, the fuel vapor phase in the said upper portion of the interior of the vessel means being free of liquid fuel in the form of finely subdivided particles when withdrawn via the said air-fuel vapor conduit means, and means for withdrawing liquid fuel from the liquid fuel phase in the lower portion of the said vessel means at a rate to maintain a desired liquid level while substantially continuously introducing the said pressurized liquid fuel.

2. The apparatus of claim 1 wherein the liquid fuel withdrawn from the lower portion of the vessel means is passed to a liquid fuel storage means which serves as a heat sink to thereby aid in stabilizing the temperature of the liquid fuel, and the said liquid fuel pressurizing means includes means for withdrawing liquid fuel from the said storage means for pressurization.

3. The apparatus of claim 1 wherein the liquid fuel withdrawn from the lower portion of the vessel means is passed to the said liquid fuel pressurizing means for pressurization and recycling to the said means for introducing liquid fuel into the said vessel means.

4. The apparatus of claim 2 wherein the said means for applying pressure to the liquid fuel includes by-pass means whereby pressurized liquid fuel may by-pass the said means for introducing liquid fuel when it is not needed for the production of additional fuel vapor.

5. The apparatus of claim 1 wherein a baffle means is in the upper portion of the interior of the vessel means and is positioned to prevent liquid fuel from being withdrawn by the fuel vapor conduit means when the said vessel means is subjected to violent movement.

6. The apparatus of claim 5 wherein the top of the baffle means is spaced from the top surface of the vessel means sufficiently to provide a passageway for the fuel vapor to flow to the fuel vapor conduit means.

7. The apparatus of claim 5 wherein the lower portion of the baffle means is provided with an opening for liquid fuel to drain therefrom.

8. The apparatus of claim 1 wherein the said apparatus also includes means for admixing unheated air at a pressure not exceeding ambient atmospheric pressure with unheated fuel vapor contained in the said vessel means to thereby produce an unheated liquid fuel-free admixture of air and fuel vapor under a pressure not exceeding the ambient atmospheric pressure whereby when the internal combustion engine is operating suction is applied to the air-fuel vapor conduit means which causes the resulting admixture of air and fuel vapor to be withdrawn from the said vessel means by suction and to be passed by suction through the air-fuel vapor conduit means to the said intake manifold means, the said means for admixing air with fuel vapor being effective to produce a withdrawn admixture of air and fuel vapor which contains sufficient air to reduce the dewpoint of the fuel vapor but insufficient air to produce a explosive mixture and also less than the amount of air required for efficient combustion of the fuel vapor in the cylinders of the internal combustion engine, and the said air-fuel vapor conduit means including means upstream of the said throttle means with respect to the flow of the admixture of air and fuel vapor for adjusting the ratio of air to fuel vapor in the said withdrawn admixture prior to its reaching the said intake manifold means to thereby add additional air and produce an explosive admixture which is free of suspended liquid fuel and contains sufficient air for efficient combustion of the fuel vapor in the cylinders of the internal combustion engine, the said air to fuel vapor ratio adjusting means including first and second intercommunicating sections of the said air-fuel vapor conduit means, the said first section being located upstream of the throttle means and the said second section being located upstream of the said first section, the said first section having a substantially larger cross-sectional area than the said second section at their point of intercommunication, the said first section being in communication with the said manifold means on its downstream end and having an adjustable air inlet means carried by the upstream end, the said second section being in intercommunication on its downstream end with the said first section downstream of the said air inlet means and on its upstream end with the interior of the said vessel means, the said air inlet means including an adjustable aperture means providing communication between the ambient atmosphere and the interior of the said first section through which a controlled amount of unheated air at a pressure not exceeding ambient atmospheric pressure is supplied to the said first section in response to suction thereon, the said aperture means including means for adjusting the effective cross sectional area thereof and thereby controlling the amount of air admitted to the said first section and the resulting ratio of air to fuel vapor passed to the said manifold means, and, the said adjusting means including means for maintaining the said aperture means in an adjusted position providing a desired ratio of air to fuel vapor whereby the internal combustion engine may be operated at varying speeds controlled by the said throttle means while maintaining the said adjusted position and the resulting desired ratio of air to fuel vapor.

9. The apparatus of claim 8 wherein the said fuel vapor conduit means also includes means located between the said second end portion thereof and the said means for adjusting the ratio of air to fuel for protecting the said vessel means against backfire from the internal combustion engine.

10. The apparatus of claim 8 wherein the said fuel vapor conduit means and the said vessel means include means for retaining the fuel vapor therein when the internal combustion engine is not operating to thereby provide fuel vapor for priming the internal combustion engine during start-up.

11. The apparatus of claim 8 wherein the said fuel vapor conduit means also includes means located between the said second end portions thereof and the said means for adjusting the ratio of air to fuel for protecting the said vessel means against backfire from the internal combustion engine.

12. The apparatus of claim 1 wherein the said means for admixing air with fuel vapor in the said vessel means includes air supply conduit means in communication with the interior of the said vessel means for supplying air thereto, check valve means in the air supply conduit means, the said air supply conduit means being located whereby air at ambient atmospheric pressure is introduced into the said vessel means at a point remote from the point of withdrawal of fuel vapor from the said vessel means by the said fuel vapor conduit means, the said vessel means being otherwise closed off to the ambient atmosphere whereby when fuel vapor is withdrawn from the said vessel means by suction on the said fuel vapor conduit means the internal pressure within the said vessel means is reduced below the ambient atmospheric pressure when the said check valve means is in the closed position, the said check valve means being normally in the closed position when the internal combustion engine is not operating and being rendered operative to allow the passage of air by suction into the said vessel when the internal combustion engine is operated and the withdrawal of fuel vapor by suction on the fuel vapor conduit means reduces the internal pressure within the said vessel means below the ambient atmospheric pressure.

13. The apparatus of claim 12 wherein the said fuel vapor conduit means also includes means located between the said second end portion thereof and the said means for adjusting the ratio of air to fuel for protecting the said vessel means against backfire from the internal combustion engine.

14. The apparatus of claim 13 wherein the said check valve means and the said means for protecting the vessel means against backfire also include means for retaining the fuel vapor in the said fuel vapor conduit means and the said vessel means when the internal combustion engine is not operating to thereby provide fuel vapor for priming the internal combustion engine during start-up.

15. In a method of generating vapor of a volatile liquid fuel for an internal combustion engine and operating an internal combustion engine therewith, the said method including providing vessel means containing the said fuel vapor thus generated in the interior thereof and an internal combustion engine for combustion of the fuel vapor, the internal combustion engine that is provided having a plurality of cylinders for combustion of the fuel vapor and air-fuel vapor supply means for supplying a combustible admixture of aid and fuel vapor to the cylinders in response to reduced pressure within the cylinders, the said air-fuel vapor supply means that is provided including an intake manifold means in communication with the interior of the cylinders, air-fuel vapor conduit means in communication with the interior of the said intake manifold means and throttle means in the said air-fuel vapor conduit means upstream of the said manifold means whereby suction is applied to the said air-fuel vapor conduit means and a combustible admixture of air and fuel vapor is supplied to the cylinders as needed for operating the internal combustion engine at varying speeds controlled by the said throttle means, the improvement which comprises providing an air-fuel vapor conduit means having first and second end portions, the said first end portion being in communication with the interior of the said intake manifold means and the said second end portion being in communication with the interior of the said vessel means containing the fuel vapor whereby when the internal combustion engine is operating the said air-fuel vapor supply means supplies fuel vapor to the cylinders and suction is applied to the air-fuel vapor conduit means which causes fuel vapor to be withdrawn from the said vessel means by suction and passed through the air-fuel vapor conduit means to the intake manifold, maintaining the interior of said said vessel means under a pressure no greater than the ambient atmospheric pressure and the contents thereof unheated by an extraneous source of heat, vaporizing volatile normally liquid fuel for an internal combustion engine to thereby produce additional fuel vapor in the said vessel means, the volatile liquid fuel being vaporized at a pressure not excceeding the ambient atmospheric pressure and with the resulting fuel vapor phase as initially vaporized being free of suspended liquid fuel droplets whereby the fuel vapor contained in the interior of the said vessel means is unheated by an extraneous source of heat, is under a pressure no greater than the ambient atmospheric pressure and is free at all times of suspended finely divided liquid fuel, the liquid fuel vapor being produced by applying pressure thereto and substantially continuously introducing an excess of the resultant pressurized liquid fuel into a lower portion of the said vessel means under vigorous conditions of agitation to thereby vaporize a portion of the liquid fuel, the said pressurized liquid fuel being introduced into the said vessel means at a rate sufficiently in excess of the vaporization rate whereby an agitated body of a freshly introduced liquid fuel phase is present in the lower portion of the said vessel means and a fuel vapor phase is present above the resultant liquid fuel phase in the upper portion of the interior of the said vessel means, the said pressurized liquid fuel being introduced into the said lower portion of the vessel means substantially uniformly across the bottom surface area thereof, the said liquid fuel being introduced under vigorous conditions of agitation but without forming a substantial amount of finely subdivided liquid fuel that becomes suspended in the fuel vapor phase, the fuel vapor phase in the said upper portion of the interior of the vessel means being free of liquid fuel in the form of finely subdivided particles when withdrawn via the air-fuel vapor conduit means, and withdrawing liquid fuel from the liquid fuel phase in the lower portion of the said vessel means at a rate to maintain a desired liquid level while substantially continuously introducing the said pressurized liquid fuel.

16. The method of claim 15 wherein the said pressurized liquid fuel is introduced into the said vessel means at a rate to produce the desired amount of fuel vapor and the rate of introducing the said pressurized liquid fuel is varied as necessary to meet the demand for additional fuel vapor.

17. The method of claim 15 wherein the liquid fuel withdrawn from the lower portion of the vessel means is passed to a liquid fuel storage vessel which serves as a heat sink to thereby aid in stabilizing the temperature of the said liquid fuel, and liquid fuel is withdrawn from the storage vessel, pressurized and then introduced into the said vessel means.

18. The method of claim 15 wherein the liquid fuel withdrawn from the lower portion of the vessel means is pressurized and then recycled back to the said vessel means under vigorous conditions of agitation.

19. The method of claim 15 including admixing unheated air at a pressure not exceeding ambient atmospheric pressure with unheated fuel vapor contained in the said vessel means to thereby produce an unheated liquid fuel-free admixture of air and fuel vapor under a pressure not exceeding the ambient atmospheric pressure whereby when the internal combustion engine is operating suction is applied to the air-fuel vapor conduit means which causes the resulting admixture of air and fuel vapor to be withdrawn from the said vessel means by suction and to be passed by suction through the air-fuel vapor conduit means to the said intake manifold means, the said withdrawn admixture of air and fuel vapor containing sufficient air to reduce the dewpoint of the fuel vapor but insufficient air to produce an explosive mixture and also less than the amount of air required for efficient combustion of the fuel vapor in the cylinders of the internal combustion engine, and adjusting the ratio of air to fuel vapor in the said withdrawn admixture upstream of the said throttle means with respect to the flow of the admixture prior to its reaching the said intake mainfold means to thereby add additional air and produce an explosive admixture which is free of suspended liquid fuel and contains sufficient air for efficient combustion of the fuel vapor in the cylinders of the internal combustion engine, the air to fuel vapor ratio being adjusted by providing means including first and second intercommunicating sections of the said air-fuel vapor conduit means, the said first section being located upstream of the throttle means and the said second section being located upstream of the said first section, the said first section having a substantially larger cross-sectional area than the said second section at their point of intercommunication, the said first section being in communication with the said manifold means on its downstream end and having an adjustable air inlet means carried by the upstream end, the said second section being in intercommunication on its downstream end with the said first section downstream of the said air inlet means and on its upstream end with the interior of the said vessel means, the said air inlet means including an adjustable aperture means providing communication between the ambient atmosphere and the interior of the said first section through which a controlled amount of unheated air at a pressure not exceeding ambient atmospheric pressure is supplied to the said first section in response to suction thereon, the said aperture means including means for adjusting the effective cross sectional area thereof and thereby controlling the amount of air admitted to the said first section and the resulting ratio of air to fuel vapor passed to the said manifold means, and the said adjusting means including means for maintaining the said aperture means in an adjusted position providing a desired ratio of air to fuel vapor whereby the internal combustion engine may be operated at varying speeds controlled by the said throttle means while maintaining the said adjusted position and the resulting desired ratio of air to fuel vapor.

20. The method of claim 19 wherein the vessel means is protected against backfire from the internal combustion engine after the ratio of air to fuel vapor is adjusted to produce an admixture containing sufficient air for efficient combustion of the fuel vapor in the internal combustion engine.

21. The method of claim 19 wherein fuel vapor is retained in the said fuel vapor conduit means and the said vessel means when the internal combustion engine is not operating to thereby provide fuel vapor for priming the internal combustion engine during start-up.

22. The method of claim 19 wherein the vessel means is protected against backfire from the internal combustion engine after the ratio of air to fuel vapor is adjusted to produce an admixture containing sufficient air for efficient combustion of the fuel vapor in the internal combustion engine.

23. In apparatus for generating vapor of a volatile liquid fuel for an internal combustion engine and operating an internal combustion engine therewith, the said apparatus including vessel means containing the said fuel vapor thus generated in the interior thereof and an internal combustion engine, the internal combustion engine having a plurality of cylinders for combustion of the fuel vapor and air-fuel vapor supply means for supplying a combustible admixture of air and fuel vapor to the cylinders in response to reduce pressure within the cylinders, the said air-fuel vapor supply means including an intake manifold means in communication with the interior of the cylinders, air-fuel vapor conduit means in communication with the interior of the said intake manifold means and throttle means in the said air-fuel vapor conduit means upstream of the said manifold means whereby suction is applied to the said air-fuel vapor conduit means and a combustible admixture of air and fuel vapor is supplied to the cylinders as needed for operating the internal combustion engine at varying speeds controlled by the said throttle means, the improvement which comprises air-fuel vapor conduit means having first and second end portions, the said first end portion being in communication with the interior of the intake manifold means and the said second end portion being in communication with an upper portion of the interior of the said vessel means containing the fuel vapor whereby when the internal combustion engine is operating the said air-fuel vapor supply means supplies fuel vapor to the cylinders and suction is applied to the said air-fuel vapor conduit means which causes fuel vapor to be withdrawn from an upper portion of the said vessel means by suction and passed through the air-fuel vapor conduit means to the said intake manifold means, the interior of the said vessel means being maintained under a pressure no greater than the ambient atmospheric pressure and the contents thereof being unheated by an extraneous source of heat, means for vaporizing volatile normally liquid fuel for an internal combustion engine to thereby produce additional fuel vapor in the said vessel means, the said vaporizing means being effective for vaporizing unheated volatile liquid fuel at a pressure not exceeding the ambient atmospheric pressure and with the resulting fuel vapor phase as initially generated being free of suspended liquid fuel droplets whereby the fuel vapor contained in the interior of the said vessel means is unheated by an extraneous source of heat, is under a pressure no greater than the ambient atmospheric pressure and is free of suspended finely divided liquid fuel, the said vaporizing means including means for applying pressure to the said liquid fuel and means for substantially continuously introducing an excess of the resultant pressurized liquid fuel into a lower portion of the said vessel means under vigorous conditions of agitation to thereby vaporize a portion of the liquid fuel, the said pressurized liquid fuel being introduced into the said vessel means at a rate sufficiently in excess of the vaporization rate whereby an agitated body of a freshly introduced liquid fuel phase is present in the lower portion of the said vessel means and a fuel vapor phase is present above the resultant liquid fuel phase in the upper portion of the interior of the said vessel means, the said means for introducing the pressurized liquid fuel being effective to introduce the liquid fuel under vigorous agitation conditions without forming a substantial amount of finely subdivided liquid fuel that becomes suspended in the fuel vapor phase, the said means for introducing pressurized liquid fuel including a plurality of elongated tubular generating members having a plurality of spaced openings formed therein through which the pressurized liquid fuel is introduced, the said tubular members having valve means therein for controlling the rate at which the pressurized liquid fuel is introduced into the said vessel means to thereby control the rate at which the liquid fuel is vaporized, the said tubular members extending substantially horizontally and being positioned adjacent the bottom of the vessel means, the said tubular members being arranged in spaced relationship across the bottom of the vessel means to thereby substantially uniformly distribute the fresh pressurized liquid fuel therein, the fuel vapor phase in the said upper portion of the interior of the vessel means being free of liquid fuel in the form of finely subdivided particles when withdrawn via the said air-fuel vapor conduit means, and means for withdrawing liquid fuel from the liquid fuel phase in the lower portion of the said vessel means at a rate to maintain a desired liquid level while substantially continuously introducing the said pressurized liquid fuel.

24. The apparatus of claim 23 wherein the plurality of openings in the tubular generating members are sized whereby pressurized liquid fuel flows from each of the said plurality of openings, the tubular generating members have a generally oval transverse cross section and the tubular generating members are positioned on the bottom of the vessel means and run generally concentrically with respect to the walls of the vessel means.

* * * * *